United States Patent [19]

Ho

[11] Patent Number: 4,718,715
[45] Date of Patent: Jan. 12, 1988

[54] ADJUSTABLE FOLDING BABY CHAIR

[76] Inventor: Ching-Chou Ho, No. 58, Ching Fong Street, Taipei, Taiwan

[21] Appl. No.: 35,459

[22] Filed: Apr. 7, 1987

[51] Int. Cl.⁴ ............................................. A47D 13/10
[52] U.S. Cl. .................................... 297/32; 297/130; 297/250; 224/155
[58] Field of Search ................. 297/130, 131, 250, 32; 224/155

[56] References Cited

U.S. PATENT DOCUMENTS

| | | | |
|---|---|---|---|
| 2,722,966 | 11/1955 | Belyeu | 297/130 |
| 3,984,115 | 10/1976 | Miller | 297/130 |
| 4,157,837 | 6/1979 | Kao | 224/155 |
| 4,500,133 | 2/1985 | Nakao et al. | 297/250 |

Primary Examiner—Francis K. Zugel
Attorney, Agent, or Firm—Bacon & Thomas

[57] ABSTRACT

This invention relates to a new baby chair, especially one which can be used as a rocking chair, carried on the back, mounted on a car seat, and adjusted in the angle of elevation of the chair back, and which, having three ⌐ shaped high-class aluminum alloys supports and two ∫ main rods connected with special connections, can be folded for easy use both at home and outdoors.

1 Claim, 10 Drawing Figures

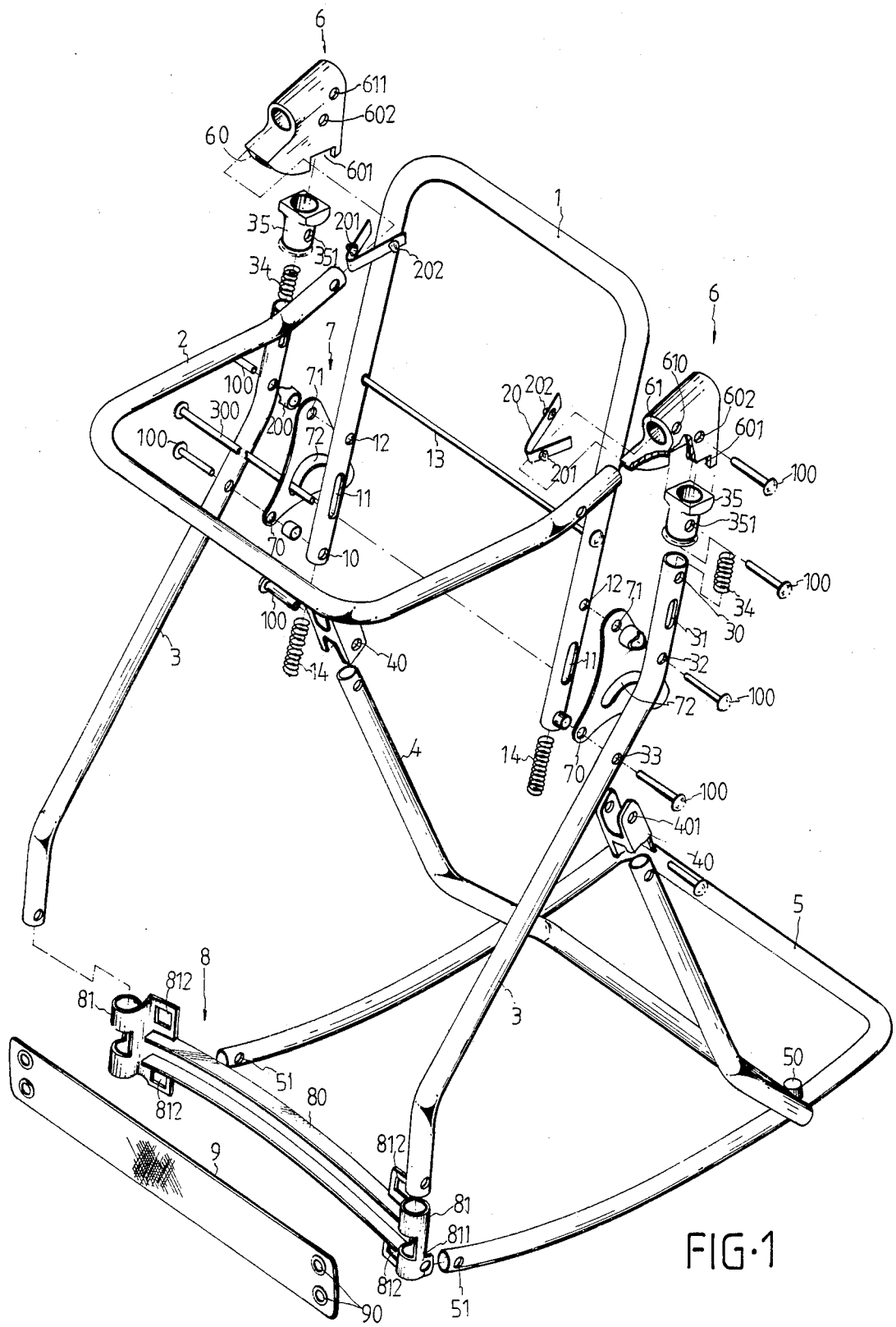
FIG·1

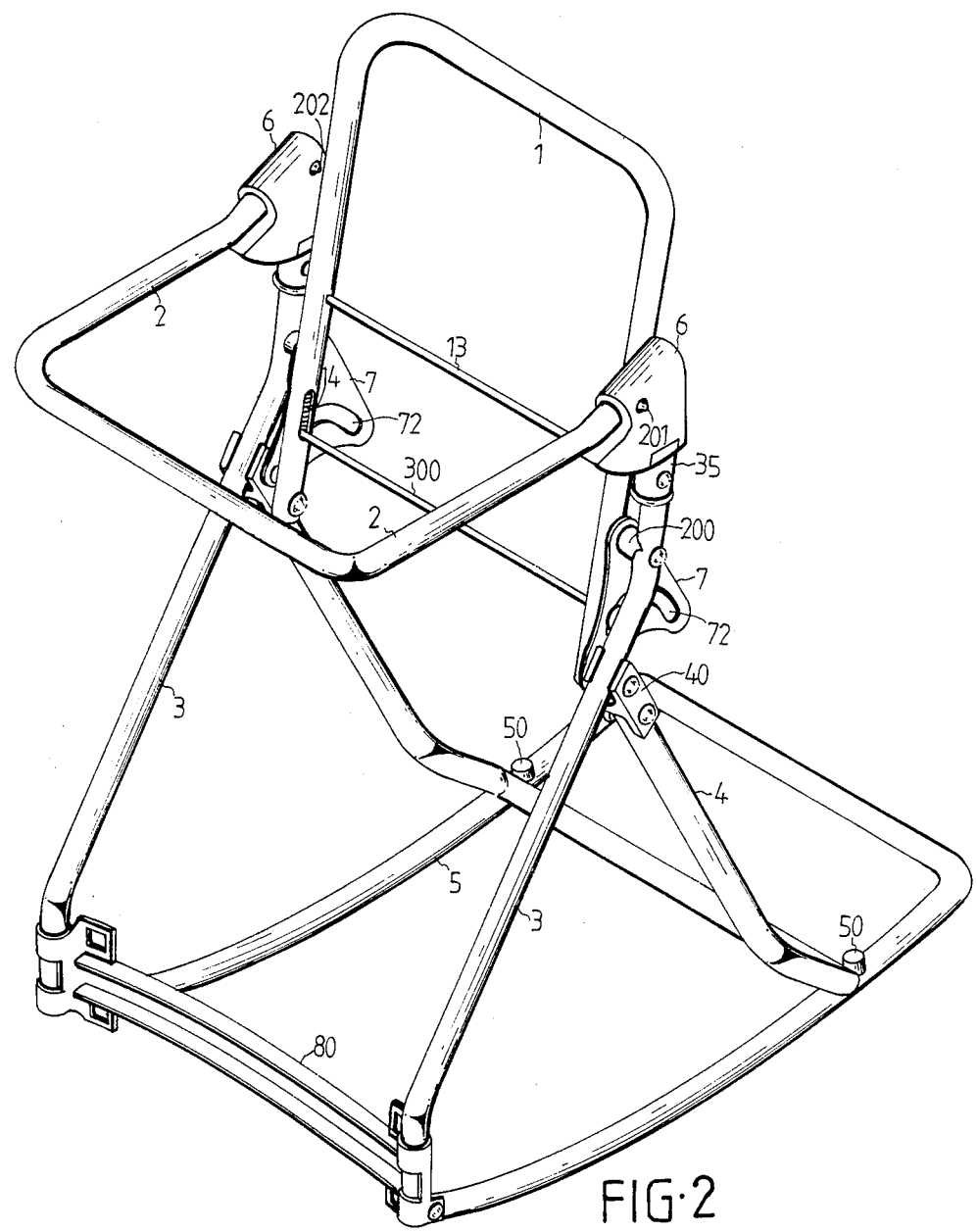
FIG·2

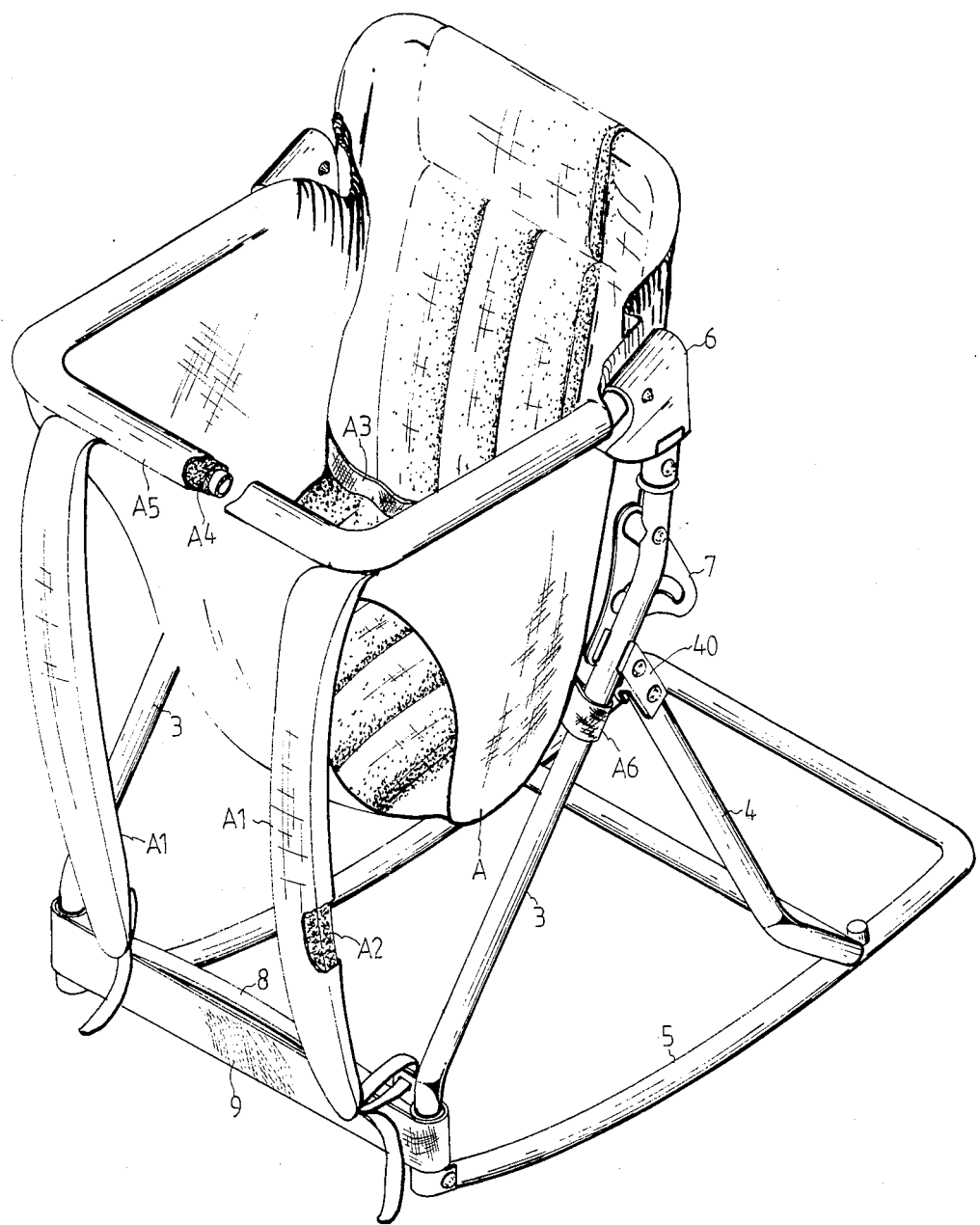
FIG·3

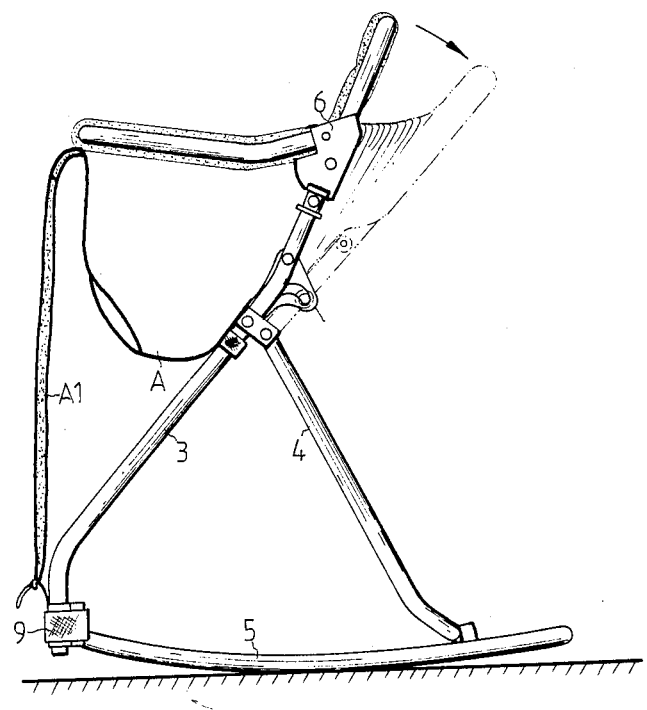
FIG·6
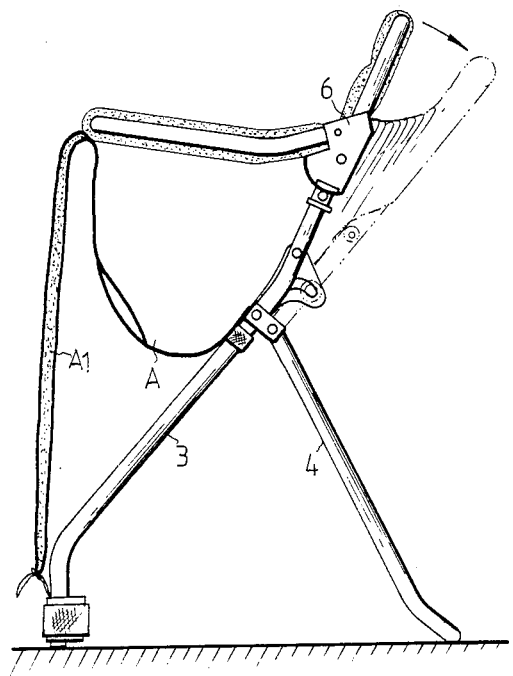
FIG·7
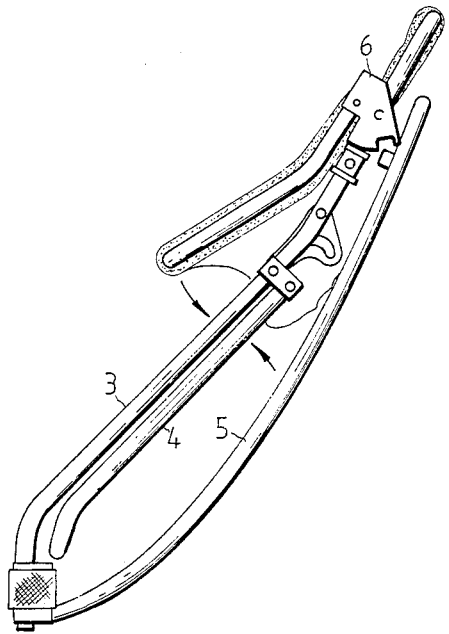
FIG·8

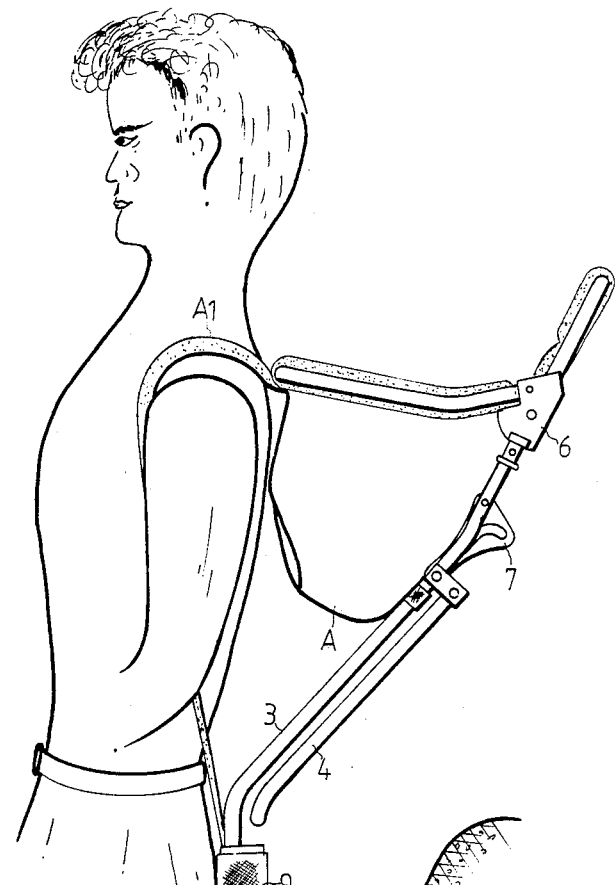
FIG·10
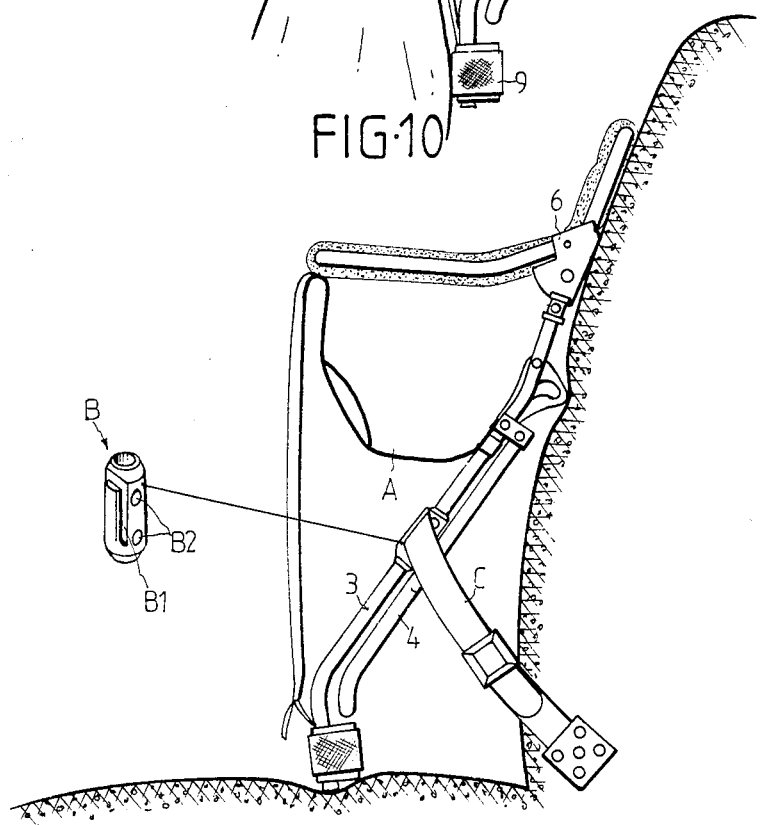
FIG·9

ADJUSTABLE FOLDING BABY CHAIR

BACKGROUND OF THE INVENTION

There is a variety of baby chairs now available on the market but no one is perfect in capacity. They are all designed for one purpose only without taking the concerned problems into consideration. So the place where they are used is limited. For example, a baby chair designed for use at home is not suitable to be carried along for use in the field or in the car because it is large, heavy and not foldable. And the conventional baby chair designed to be carried on the back fails to consider the comfort of the baby sitting in and the convenience for the carrier to carry. Therefore there is no baby chairs which can be used at home and outdoors, and carried on the back is currently available on the market.

SUMMARY OF THE INVENTION

In view of the above mentioned disadvantages, the inventor tried hard to make improvements and developed the present invention.

So the main object of this invention is to provide a baby chair which can be carried on the back and of which the angle of elevation is adjustable so that the baby sitting in will feel more comfortable when being carried on the back.

Another object of this invention is to provide a baby chair which can be used as a rocking chair.

Still another object of this invention is to provide a baby chair which is foldable for easy packing carrying and storing so that it can be used both at home and outdoors.

Still another object of this invention is to provide a baby chair of which the seat is removable for easy cleaning.

BRIEF DESCRIPTION OF THE DRAWINGS

FIG. 1 is an exploded view of the framework of the adjustable folding baby chair of this invention.

FIG. 2 is a vertical view of the framework of the said baby chair.

FIG. 3 is a vertical view of the said baby chair.

FIG. 6 is a side view of the said baby chair used as a rocking chair.

FIG. 7 is a side view of the said baby chair used as a common chair.

FIG. 8 is a side view of the said baby chair as it is folded.

FIG. 9 is a side view of the said baby chair after it is mounted on the car seat.

FIG. 10 is a side view of the said baby chair after it is carried on the back.

DETAILED DESCRIPTION OF THE PREFERRED EMBODIMENT

Figure 5:
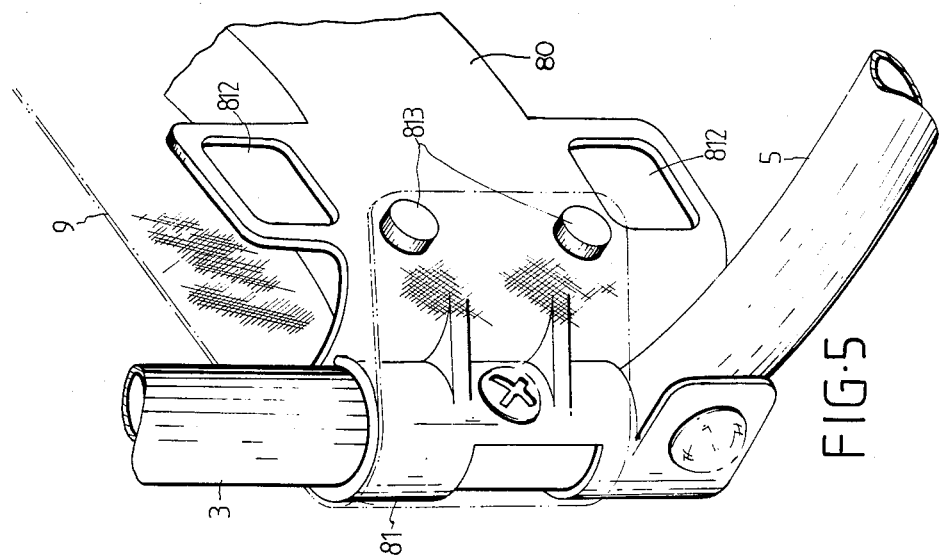
FIG. 5 illustrates the connection of the plastic foot board and the main rod and rocker of the said baby chair.
Figure 4:
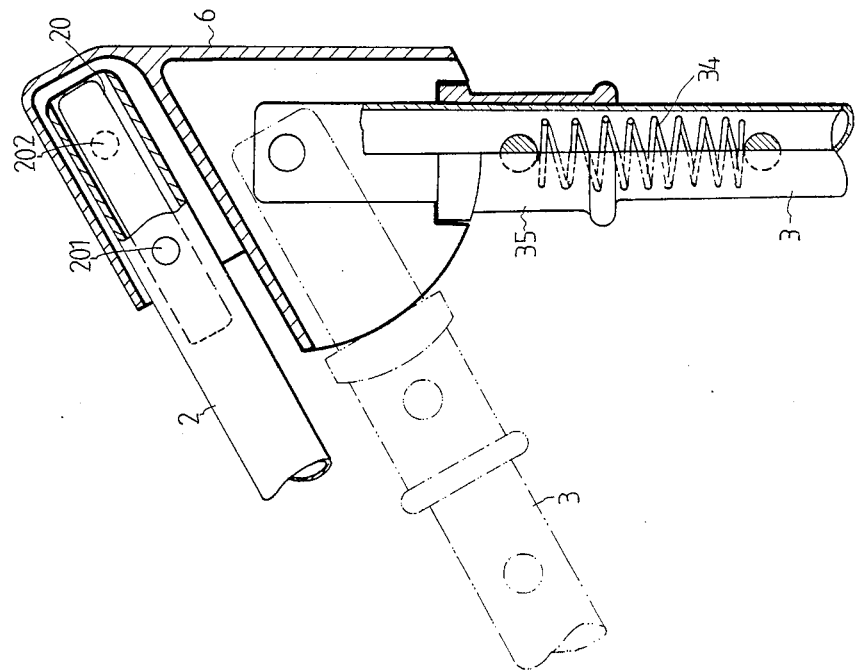
FIG. 4 illustrates the connection of seat support and main rod of the said baby chair.

Referring now to the drawings, the nature of this invention is described as follows:

As shown in FIG. 1, the framework of the adjustable folding baby chair comprises a ⌐ back support 1, a ⌐ seat support 2, a pair of ╱ main rods 3, a ⌐ stay rod 4, a ⌐ rocker 5, two sets of seat connectors 6, two adjusting plates 7, a plastic foot board 8 and a protective band 9. The ⌐ back support 1 with a rivet hole 10, a slot 11 and another rivet hole 12 in each side piece, has a cross bar 13 connected to the two side pieces at the middle above the rivet hole 12, and a compression spring 14 of suitable length fitted in each of the side pieces between the slot 11 and the rivet hole 12. The ⌐ seat support 2 with a part of the ends bending upward, has a V spring catch 20 fitted in the ends with its front and rear conical projections 201, 202 coming out of the holes in the end parts. Each of the ╱ main rods 3 with a rivet hole 30, a slot 31 and two other rivet holes 32, 33 in the part near the top end, has a compression spring 34 of suitable length fitted in the part between the rivet hole 30 and slot 31, and a square-headed telescopic cap 35 fitted on the top end and having a rivet hole 351 in the cylindrical part. The ⌐ stay rod 4 with its top end part bending up slightly has on each end a H connector 40 with rivet holes 401 in the top and bottom ends. The ⌐ rocker 5 has a stop block 50 on each side piece near the rear end, and a rivet hole 51 used with a rivet 100 to fix the end to the foot board 8. The seat connector 6 consists of a hollow sector case 60 and a tubular part 61 on the top. The tubular part 61 has corresponding holes 610, 611 on both side walls for the conical projections 201, 202 of the V spring catch 20 to snap in after coming out of the holes in the end of the seat support 2. The hollow sector case 60 has a notch 601 at the bottom and a rivet hole 602 in the side wall above the notch 601. The adjusting plate 7 roughly in Δ shape has rivet holes 70, 71 in two corners and a curved slot 72 spreading from the third corner. The plastic foot board 8 consists of a channel plate 80 and two δ connectors 81 which are molded in an integrated part of the channel plate 80. As shown in FIG. 5, the δ connector 81 has a square recess 811 in the bottom of the knuckle part, two tabs 812 on the top and bottom edges, and two projections 813 on the back between the two tabs 812. The protective band 9 has two holes 90 in each end. These parts and elements are assembled into a baby chair as shown in FIG. 2. First, the ╱ main rods 3 and the foot board 8 are fastened together with rivets 100 and the H connectors 40 are fixed to the ╱ main rods 3 with rivets 100 by being inserted through the rivet holes 33, 401. Then rivets 100 are used to fasten the ╱ main rods 3, adjusting plate 7, back support 1 and bushing 200 together by being inserted through the rivet holes 32, 71, 12 of them. After the compression springs 34, 14 are respectively fitted in the main rods 3 and the back supports 1 and the square-headed caps 35 are put on the top ends of the main rods 3 and fixed with rivets 100 by inserting through the rivet holes 351 in the cylindrical part of the telescopic cap 35 and the slot 31 in the top ends of the main rods 3. The adjusting bar 300 is inserted in the curved slot 72 of the adjusting plate 7 and the slot 11 of the back support 1 and is riveted thereby. Then the telescopic cap 35 is pressed down to allow the part with the rivet hole 30 to come out of the telescopic cap 35 for the seat support connector 6 to fit on and to be fixed thereto with rivets 100. Finally, the ends of the seat support 2 are inserted in the holes of the seat connectors 6 to allow the conical projections 201, 202 of the spring catches 20 to snap in the holes 610, 611 as shown in FIG. 4.

As shown in FIG. 3, the seat A made of fabrics in the size corresponding to the said framework has two shoulder straps A1 for use to carry the baby chair on the back and a waist strap A3 for safety purpose. Except the shoulder straps A1, the seat and back are fitted with sponge A2 so that the baby sitting in will feel comfortable. In installing, the ends of the ⌐ seat support 2 are pulled out of the seat support connectors 6 by depressing the conical projections of the spring catches 20. The seat support 2 is first fitted in a sponge tube A4 and then in the tubelike part A5 of the seat A. The back pad is attached to the back support 1. Then the two ends of the ⌐ seat support 2 with the seat A are snapped in the holes of seat connectors 6 and the bottom of the seat A is attached to the main rods 3 by means of the main rod straps A6. The seat A can be removed for cleaning in the reversed procedures.

The application of the adjustable folding baby chair is shown in FIGS. 6-8. As shown in FIG. 6, the baby chair with the ⌐ rocker 5 can be used as a rocking chair. The angle of elration of the back can be adjusted by moving the adjusting bar 300 of the back support 1 from one end of the curved slot 72 of the adjusting plate 7 to the other end as shown in FIG. 6 with dotted line. The ⌐ rocker 5 may be removed so that the chair can be used as a common chair as shown in FIG. 7. The baby chair can be folded for carrying and storing by moving the ⌐ stay rod 4 closer to the ⌐ main rods 3, pushing the back support 1 forward to its original position, pressing down the square-headed telescopic caps 35 to disengage them from the recesses 601 of the seat connectors 6 and to move along the edge of the sector case 60 toward the ⌐ seat support 2 as shown in FIG. 4 with dotted lines, and moving the ⌐ rocker 5 close to the ⌐ main rods 3 as shown in FIG. 8.

As shown in FIG. 10, the baby chair with the stay rod 4 and ⌐ rocker 5 folded (or removed) can be carried on the back by putting two shoulder straps A1 on the shoulders. In this case, the foot board 8 is hung down naturally and the protective band 9 protects the carrier from being hurted by the chair framework. In addition, a tubular fastener B with a slot B1 and two rivet holes B2 may be fitted on the ⌐ main rod 3 so that the baby chair can be fixed to the car seat by inserting the safety strap C through the slot B1 and having it buckled as shown in FIG. 9.

From the above it is clear that the baby chair of this invention can be adjusted to meet the baby's need (sitting, lying, rocking and on-back carrying) and can be folded for easy packing, storing and transporting. It is a useful instrument for the parents to nurse their baby at home and outdoors. It is very safe to use because the frame is covered with sponge and it is very easy to clean because the seat is removable. So it is very practical and economical for the consumers.

I claim:

1. An adjustable folding baby chair characterized by comprising:

a back support with two rivet holes and a slot in the part near each end, having a cross bar connected to the side pieces and two compression springs of suitable length fitted in the end parts between the slot and one of the rivet holes, two main rods, with three rivet holes and a slot in the part near each top end and with a rivet hole in the part near each bottom end, having a compression spring of suitable length fitted in the part between the slot and the lower rivet hole, a square-headed telescopic cap fitted on the end and fixed with a rivet being inserted through the slot, a plastic foot board consisting of a channel plate and two connectors with tabs and recesses at each end for connecting the main rods and the rocker specified below, a rocker connected to the foot board and having a stop block on each side piece, a stay rod, with two end parts slightly bent, connected to the main rods with H connectors and rivets inserted in the third rivet holes of the main rods, a pair of adjusting plates, each plate being triangular shaped and having rivet holes in the corners to be fixed between the back support and main rod, and having a curved slot through which the cross bar is inserted, two seat support connectors each consisting of a tubular part on the top for holding the seat support, and a hollow sector case having a notch at the bottom to receive the square-headed telescopic cap and a rivet hole for fixing the main rod, a seat support with two end parts bent slightly and fastened to the seat support connectors by means of V spring catches with conical projections snapped in the holes in the end parts, a seat made in the size corresponding to the framework and having two shoulder straps for use to carry the chair on the back, a waist strap for safety purpose, and a tubular fastener to fasten the baby chair on the car seat with the car safety strap, a protective band fixed to the foot board to protect the carrier when the baby chair is carried on the back.

* * * * *